US010966419B1

(12) United States Patent
Hernandez et al.

(10) Patent No.: US 10,966,419 B1
(45) Date of Patent: Apr. 6, 2021

(54) TROLLING ASSEMBLY WITH BREAKAWAY SYSTEM

(71) Applicants: John M. Hernandez, Miami, FL (US); Adolfo Martinez, Homestead, FL (US)

(72) Inventors: John M. Hernandez, Miami, FL (US); Adolfo Martinez, Homestead, FL (US)

( * ) Notice: Subject to any disclaimer, the term of this patent is extended or adjusted under 35 U.S.C. 154(b) by 465 days.

(21) Appl. No.: 16/036,468

(22) Filed: Jul. 16, 2018

(51) Int. Cl.
  *A01K 91/08*  (2006.01)
  *A01K 91/053* (2006.01)
  *A01K 99/00*  (2006.01)
  *A01K 95/00*  (2006.01)
  *A01K 91/03*  (2006.01)
  *A01K 91/06*  (2006.01)

(52) U.S. Cl.
  CPC .............. *A01K 91/08* (2013.01); *A01K 91/03* (2013.01); *A01K 91/053* (2013.01); *A01K 91/06* (2013.01); *A01K 95/00* (2013.01); *A01K 99/00* (2013.01)

(58) Field of Classification Search
  CPC ....... A01K 91/053; A01K 91/08; A01K 97/10
  USPC ..... 43/27.4, 43.12, 43.13, 21.2, 44.87, 44.9, 43/44.91; 114/255, 364
  See application file for complete search history.

(56) References Cited

U.S. PATENT DOCUMENTS

| | | | | |
|---|---|---|---|---|
| 2,612,712 A * | 10/1952 | Kruze | ................... | A01K 97/10 43/4 |
| 3,008,259 A * | 11/1961 | Zornes | ................... | A01K 91/08 43/43.12 |
| 3,032,912 A * | 5/1962 | Bengtsson | ............. | A01K 91/08 43/43.13 |
| 3,091,050 A * | 5/1963 | Metzler | ................... | A01K 95/00 43/44.88 |
| 3,104,488 A * | 9/1963 | Hicks | ..................... | A01K 91/06 43/44.88 |
| 3,193,964 A * | 7/1965 | Hurst | ..................... | A01K 91/08 43/43.12 |
| 3,733,734 A * | 5/1973 | Hysaw | ................... | A01K 93/00 43/44.9 |
| 3,740,706 A * | 6/1973 | Joseph | ................... | H04B 11/00 367/173 |
| 3,874,109 A * | 4/1975 | Peterson | ................ | A01K 85/14 43/42.22 |
| 3,874,110 A * | 4/1975 | Larson | ................... | A01K 91/08 43/43.12 |
| 3,941,072 A * | 3/1976 | Caton | .................. | B63H 25/382 114/165 |

(Continued)

*Primary Examiner* — Darren W Ark
(74) *Attorney, Agent, or Firm* — Albert Bordas, P.A.

(57) ABSTRACT

A trolling assembly with breakaway system, that has a movable arm assembly, an adjustable assembly, a mounting assembly, which has an extension arm having a first angle, an arm connector assembly, an actuator assembly, and a shield arm assembly that defines an acute angle, while in a deployed configuration, with a water line that a sea vessel is in while in a path of travel to shield a fishing line and baits and/or lures from seaweed and debris by pushing the seaweed and debris upwardly towards the water line along a tapered end of the shield arm assembly to then be released. The shield arm assembly, in the deployed configuration, extends outwardly from the sea vessel to define a second angle, and is fixedly connected to the arm connector assembly providing the shield arm assembly a predetermined resistance to maintain the acute angle while in the deployed configuration.

13 Claims, 8 Drawing Sheets

(56) References Cited

U.S. PATENT DOCUMENTS

| | | | | |
|---|---|---|---|---|
| 3,955,305 A * | 5/1976 | Roberts | A01K 95/00 | 43/44.91 |
| 3,961,437 A * | 6/1976 | Lewis | A01K 91/08 | 43/27.4 |
| 3,968,587 A * | 7/1976 | Kammeraad | A01K 91/08 | 43/27.4 |
| 3,989,216 A * | 11/1976 | Veatch | G10K 11/004 | 248/278.1 |
| 4,044,489 A * | 8/1977 | Henze | A01K 91/08 | 43/27.4 |
| 4,069,611 A * | 1/1978 | Dusich | A01K 91/08 | 43/43.12 |
| 4,161,078 A * | 7/1979 | Pagani | A01K 91/08 | 43/42.04 |
| 4,173,091 A * | 11/1979 | Emory, Jr. | A01K 91/08 | 43/43.12 |
| 4,221,068 A * | 9/1980 | Roemer, Jr. | A01K 91/08 | 43/43.12 |
| 4,248,002 A * | 2/1981 | McNellis | A01K 91/08 | 242/397.1 |
| 4,279,092 A * | 7/1981 | Hutson | A01K 95/00 | 43/44.89 |
| 4,417,414 A * | 11/1983 | Hood | A01K 91/08 | 43/43.12 |
| 4,486,970 A * | 12/1984 | Larson | A01K 91/08 | 43/43.13 |
| 4,520,589 A * | 6/1985 | Lummis | A01K 91/08 | 43/27.4 |
| 4,538,372 A * | 9/1985 | Petigoretz | A01K 91/08 | 24/129 C |
| 4,598,493 A * | 7/1986 | O'Brien | A01K 97/24 | 24/572.1 |
| 4,610,409 A * | 9/1986 | Emory, Jr. | A01K 91/08 | 254/326 |
| 4,615,135 A * | 10/1986 | Swinbanks | A01K 91/03 | 43/43.13 |
| 4,619,070 A * | 10/1986 | Jung | A01K 91/08 | 43/42.05 |
| 4,716,674 A * | 1/1988 | Kammeraad | A01K 91/08 | 248/231.9 |
| 4,750,288 A * | 6/1988 | Brennan | A01K 91/08 | 43/43.1 |
| 4,813,171 A * | 3/1989 | Cooper | A01K 91/08 | 43/21.2 |
| 4,813,172 A * | 3/1989 | McCue | A01K 91/08 | 43/43.12 |
| 4,852,292 A * | 8/1989 | Pease | A01K 91/03 | 43/27.4 |
| 4,928,420 A * | 5/1990 | Jackson | A01K 91/08 | 43/27.4 |
| 4,948,083 A * | 8/1990 | McNaney, Jr. | A01K 91/08 | 248/289.11 |
| 5,018,296 A * | 5/1991 | Putz, II | A01K 91/08 | 43/42.13 |
| 5,033,226 A * | 7/1991 | Jackson | A01K 91/08 | 43/43.12 |
| 5,137,249 A * | 8/1992 | Royster | B63B 34/20 | 248/642 |
| 5,170,581 A * | 12/1992 | Lyons | A01K 91/08 | 43/17 |
| 5,301,451 A * | 4/1994 | VanAssche | A01K 91/08 | 43/21.2 |
| 5,428,920 A * | 7/1995 | Levin | A01K 93/00 | 43/44.89 |
| 5,445,102 A * | 8/1995 | Rupp | B63B 35/14 | 114/255 |
| 5,457,909 A * | 10/1995 | Graves | A01K 95/00 | 43/44.91 |
| 5,461,821 A * | 10/1995 | Carter, Jr. | A01K 95/00 | 43/43.12 |
| 5,611,167 A * | 3/1997 | Mills | A01K 91/08 | 43/43.1 |
| 5,941,009 A * | 8/1999 | Aas | A01K 91/18 | 43/4 |
| 6,065,420 A * | 5/2000 | Smith | B63B 49/00 | 114/343 |
| 6,405,670 B1 * | 6/2002 | Desantis | B63C 1/10 | 114/219 |
| 6,408,779 B1 * | 6/2002 | Roy | B63B 17/00 | 114/255 |
| 6,505,431 B1 * | 1/2003 | Christian | A01K 91/08 | 43/19.2 |
| 6,591,541 B1 * | 7/2003 | Cummings | A01K 97/10 | 248/514 |
| 6,658,784 B1 * | 12/2003 | Mastropaolo | A01K 91/08 | 43/42.22 |
| 6,668,745 B2 * | 12/2003 | Slatter | A01K 91/08 | 114/255 |
| 6,684,558 B1 * | 2/2004 | Gillespie | A01K 91/08 | 43/26.1 |
| 6,918,203 B2 * | 7/2005 | Robichaud | A01K 77/00 | 114/255 |
| 6,978,570 B1 * | 12/2005 | Clark | A01K 91/08 | 114/255 |
| 7,007,906 B2 * | 3/2006 | Slatter | A01K 91/08 | 114/255 |
| 7,036,451 B1 * | 5/2006 | Hutchinson | B63B 17/00 | 114/364 |
| 7,143,541 B2 * | 12/2006 | Buero | A01K 91/08 | 43/43.12 |
| 7,296,377 B2 * | 11/2007 | Wilcox | A01K 91/08 | 114/255 |
| 7,380,365 B2 * | 6/2008 | Noraker | A01K 85/01 | 43/42.06 |
| 7,698,850 B2 * | 4/2010 | Harris | A01K 97/01 | 43/4 |
| 7,941,964 B2 * | 5/2011 | Stanton | A01K 97/10 | 43/21.2 |
| 7,971,839 B2 * | 7/2011 | Upchurch | B63C 11/48 | 248/276.1 |
| 7,984,582 B2 * | 7/2011 | Brinker | A01K 91/08 | 43/43.12 |
| 8,109,034 B1 * | 2/2012 | McCauley | A01K 87/02 | 43/27.2 |
| 8,819,986 B2 * | 9/2014 | Bennis | A01K 91/06 | 43/17.5 |
| 8,826,584 B1 * | 9/2014 | Hernandez | A01K 91/08 | 43/27.4 |
| 9,756,840 B1 * | 9/2017 | Hernandez | A01K 91/06 | |
| 2004/0244270 A1 * | 12/2004 | Brinker | A01K 91/08 | 43/43.13 |
| 2006/0213113 A1 * | 9/2006 | Emory | A01K 91/08 | 43/43.13 |
| 2007/0119089 A1 * | 5/2007 | Nicholson | A01K 91/08 | 43/27.4 |
| 2007/0163484 A1 * | 7/2007 | Eng | B63B 27/143 | 114/362 |
| 2008/0011218 A1 * | 1/2008 | Smith | B63B 17/00 | 114/364 |
| 2008/0053361 A1 * | 3/2008 | Nicholson | A01K 91/08 | 114/364 |
| 2009/0188151 A1 * | 7/2009 | Bartholomew | A01K 95/005 | 43/44.91 |
| 2010/0005702 A1 * | 1/2010 | Palacios Cortell | A01K 91/08 | 43/26.1 |
| 2010/0223834 A1 * | 9/2010 | Osborn | A01K 91/08 | 43/43.13 |
| 2011/0083355 A1 * | 4/2011 | Wilcox | A01K 91/08 | 43/27.4 |
| 2012/0017490 A1 * | 1/2012 | Wessner | A01K 95/005 | 43/43.12 |
| 2020/0037592 A1 * | 2/2020 | Hisel, Sr. | A01K 97/24 | |

* cited by examiner

TROLLING ASSEMBLY WITH BREAKAWAY SYSTEM

BACKGROUND OF THE INVENTION

1. Field of the Invention

The present invention relates to trolling assemblies, and more particularly, to trolling assemblies having breakaway systems.

2. Description of the Related Art

Applicant believes that one of the closest references corresponds to U.S. Pat. No. 3,091,050 issued to Phares H. Metzler on May 28, 1963 for Line retaining means for fishing line accessories. However, it differs from the present invention because Metzler teaches a fishing equipment for retaining lines in fishing accessories such as sinkers.

Applicant believes that another reference corresponds to U.S. Pat. No. 5,428,920 issued to John M. Levin on Jul. 4, 1995 for Bobber and sinker. However, it differs from the present invention because Levin teaches a bobber and sinker, which can be attached and detached from fishing lines. The sinker is made of a single high density material, such as rubber, in which a slit has been made, to frictionally hold the fishing line. The bobber has an inner segment of high density material and an outer shell of high flotation material. A slit in the outer segment frictionally holds the fishing line. The bobber and sinker can be rapidly attached and detached from a fishing line by inserting the fishing line into the slits. Also, the bobber and sinker may be positioned and repositioned along the fishing line, and the fishing line is frictionally held without the need for any operations or mechanisms to secure or hold the fishing line in place. Alternatively, to provide a sinker of higher density, the sinker can comprise an outer shell, an inner core of higher density material than the material of the outer shell, with a slit in the outer shell frictionally holding the fishing line.

Applicant believes that another reference corresponds to U.S. Pat. No. 5,457,909 issued to Herbert K. Graves on Oct. 17, 1995 for Fishing weight assembly. However, it differs from the present invention because Graves teaches a fishing weight assembly that includes a weight body with a central bore to receive a fishing line and an opening transversely of the bore, a retainer member adapted for insertion into the opening with portions compressible by walls of the opening upon insertion of the retainer member to clamp the line. Serrations on confronting portions off the retainer can better clamp the line. One embodiment has a radially extending slot for insertion of a fishing line. Edge portions of the weight adjacent to the weight body opening may be deformable to provide retaining ridges to prevent exit of the retainer.

Applicant believes that another reference corresponds to U.S. Pat. No. 4,598,493 issued to O'Brien, et al. on Jul. 8, 1986 for Retrieving device for snagged fishing apparatus. However, it differs from the present invention because O'Brien, et al. teach a retrieving device for a snagged fishing apparatus such as lures and hooks wherein a weighted body is self-guided along a snagged line as it is lowered by a retrieving line connected to the retrieving device. When the retrieving device contacts the end of the snagged line, it either jars the hook or lure free from the snag, or flexible chains suspended from the weighted body engage in the vicinity of the snag as the main body is jostled. By engagement of one or more hooks through apertures in at least one of the chains, the hook or lure is unsnagged as the retrieving line pulls on the retrieving device.

Applicant believes that another reference corresponds to U.S. Pat. No. 7,984,582 issued to Brinker, et al. on Jul. 26, 2011 for Fishing line release system. However, it differs from the present invention because Brinker, et al. teach a fishing line release system that includes a fishing line quick release mechanism that may be used in conjunction with a planar device for trolling or may alternatively be used with a down rigger cable and weight when used in down rigger fishing. When used in conjunction with the planar device, the system may be used for directional trolling. The planar device comprises a planar body, the fishing line quick release mechanism attached to the planar body, and a line locking assembly for securing a portion of a fishing line to the planar body. When used in conjunction with a down rigger cable and weight, the quick release mechanism may be used either on the down rigger cable or may be attached to the down rigger weight.

Applicant believes that another reference corresponds to U.S. Pat. No. 7,941,964 issued to Kim Stanton on May 17, 2011 for Multiple use fishing assembly. However, it differs from the present invention because Stanton teaches a multiple use fishing assembly that includes a fishing rod holding unit capable of holding at least one fishing rod. This fishing rod holding unit is designed and configured to have various components removably secured thereto. One component is a removable outrigger assembly. When attached the fishing assembly will be a combined fishing rod holding unit and outrigger. If the outrigger is not desired, then the user can remove the outrigger and optionally can removably secure an additional fishing rod holding apparatus. Such a configuration enables the user to select his desired fishing option.

Applicant believes that another reference corresponds to U.S. Pat. No. 6,505,431 issued to Christian, et al. on Jan. 14, 2003 for Tip up downrigger assembly with safety configured and inboard positioned catch pin. However, it differs from the present invention because Christian, et al. teach a fishing downrigger assembly secured to the stern of a boat for use with a fishing rod and reel during trolling. A substantially planar shaped base has a top face with an upwardly extending superstructure, a spaced apart bottom face defining therebetween a predetermined thickness, a front end and a rear end. An arm pivotally secures to the base along an axis defined therebetween and so that a substantially elongated portion of the arm extends substantially upwardly and forwardly from the base. A reel is rotatably secured to the superstructure, a cable extending from the reel and which is guided along the arm before terminating in a suspended weight. The reel further includes at least one line release clip located at a selected distance from the weight and which is capable of being engaged by the fishing reel. A catch mechanism is established between the base and the pivoting arm and actuates in a direction substantially parallel and offset relative to the pivotal axis. The catch mechanism includes a spring pin substantially hidden from view of the user, except for a pull knob, and which fixedly engages an abutting and rotating surface of the arm upon being actuated from a first extended and outboard position in which said weight is positioned at a selected depth beneath the boat to a second and inboard position.

Applicant believes that another reference corresponds to U.S. Pat. No. 8,826,584 issued to Applicant's own Hernandez, et al. on Sep. 9, 2014 for Trolling assembly. However, it differs from the present invention because Hernandez, et al. teach a trolling assembly structured to protect at least a portion of a fishing line from water-borne debris while trolling in a body of water from a boat that includes a first positioning assembly attached to the boat and being adjustable to facilitate positioning the portion of the fishing line in a first predetermined spaced relation to the boat, and a second positioning assembly interconnected to the first positioning assembly and being positionable to facilitate positioning the portion of the fishing line in a second predetermined spaced relation to the boat. The trolling assembly also includes a shield assembly, interconnected to the second positioning assembly, which is structured to releasably retain the portion of the fishing line below a surface of the body of water while trolling, and to protect at least the portion of the fishing line from water-borne debris while trolling.

Applicant believes that another reference corresponds to U.S. Pat. No. 9,756,840 issued to Applicant's own Hernandez, et al. on Sep. 12, 2017 for Trolling assembly. However, it differs from the present invention because Hernandez, et al. teach a trolling assembly structured to protect at least a portion of a fishing line from water-borne debris while trolling in a body of water from a boat that includes a first positioning assembly attached to the boat and being adjustable to facilitate positioning the portion of the fishing line in a first predetermined spaced relation to the boat, and a second positioning assembly interconnected to the first positioning assembly and being positionable to facilitate positioning the portion of the fishing line in a second predetermined spaced relation to the boat. The trolling assembly also includes a shield assembly, interconnected to the second positioning assembly, which is structured to releasably retain the portion of the fishing line below a surface of the body of water while trolling, and to protect at least the portion of the fishing line from water-borne debris while trolling.

Applicant believes that another reference corresponds to U.S. Patent Application Publication No. 2009/0188151, published on Jul. 30, 2009 to R. Mark Bartholomew for Sliding fishing float and sinker. However, it differs from the present invention because Bartholomew teaches a multi-function float/sinker of a plastic material either a quick attachment or removal from the fishing line without the need for cutting the fishing line. The four-piece device has a hollow body that is adapted to receive water or other material that has an overall specific gravity weight greater than one. It can serve as a float, or as a casting bubble or as a sinker. It has a water-tight snap-on cover for the cavity and on the opposite side of the body an insert placed in slot, the two acting together form a passageway for the fishing line or for the retainer.

Other patents describing the closest subject matter provide for a number of more or less complicated features that fail to solve the problem in an efficient and economical way.

None of these patents suggest the novel features of the present invention.

SUMMARY OF THE INVENTION

The present invention is a trolling assembly with breakaway system, comprising a movable arm assembly, an adjustable assembly, a mounting assembly comprising an extension arm having a first predetermined angle, an arm connector assembly, an actuator assembly, and a shield arm assembly that defines an acute angle, while in a deployed configuration, with a water line that the sea vessel is in while in a path of travel to shield a fishing line and baits and/or lures from seaweed and debris by pushing the seaweed and debris upwardly towards the water line along a tapered end of the shield arm assembly to then be released. The mounting assembly is removably mounted onto the sea vessel.

The shield arm assembly, while in the deployed configuration, extends outwardly from the sea vessel to define a second predetermined angle. The shield arm assembly is fixedly connected to the arm connector assembly providing the shield arm assembly a predetermined resistance to maintain the acute angle while in the deployed configuration. The arm connector assembly comprises first and second springs and first and second spring retainers. The shield arm assembly releases from the acute angle when a predetermined force greater than the predetermined resistance is applied onto the shield arm assembly.

The movable arm assembly comprises an arm having first and second ends, a bumper, and a springed actuator holder. The adjustable assembly comprises first and second external plates, first and second internal faces, first and second external plate holes, first and second internal plates, a holding plate, and a connector bolt. The first and second internal plates are attached to respective first and second internal faces. The holding plate extends from the first internal face to the second internal face.

The movable arm assembly is movably connected to the adjustable assembly, whereby the arm hingedly rotates approximately up to 300 degrees upon the connector bolt. The mounting assembly further comprises a cover, a mounting base having first and second lateral walls, and a mounting hole. The mounting hole extends from the first lateral wall, through the cover, to the second lateral wall to receive the extension arm. The extension arm comprises first and second extension arm ends and extends from the mounting assembly to connect with the adjustable assembly. A first portion of the extension arm passes through the mounting hole, and the first extension arm end extends from the first lateral wall. A second portion of the extension arm passes through the first and second external plate holes and the second extension arm end extends from the first external plate. The arm connector assembly further comprises first and second plates, first and second hooks, angle adjustment holes, and a pin.

The actuator assembly comprises an actuator arm with a handle, a coupling structure, and a retention tab. The shield arm assembly comprises first and second arm walls that define the tapered end towards the path of travel, a guide member having a slot, a release member, and a channel. The actuator assembly moves the movable arm assembly and the shield arm assembly to place the shield arm assembly into the deployed configuration and a retracted configuration. The movable arm assembly is connected to the arm connector assembly, whereby the movable arm connector assembly hingedly rotates upon a connecting bolt. While in the deployed configuration, a first portion of the fishing line is aligned by the guide member and is held into the channel toward the release member and a second portion of the fishing line extends therefrom with the baits and/or lures for fishing.

It is therefore one of the main objects of the present invention to provide a trolling assembly with breakaway system that mounts onto a sea vessel.

It is another object of this invention to provide a trolling assembly with breakaway system having a shield arm assembly that defines an acute angle, while in a deployed configuration, with a water line that the sea vessel is in while in a path of travel to shield a fishing line and baits and/or lures from seaweed and debris.

It is another object of this invention to provide a trolling assembly with breakaway system to releasably retain a portion of a fishing line at a predetermined depth beneath the surface of water while trolling.

It is another object of this invention to provide a trolling assembly with breakaway system to protect the fishing line from seaweed and debris while the sea vessel is in a path of travel.

It is another object of this invention to provide a trolling assembly with breakaway system that is volumetrically efficient for carrying, transporting, and storage.

It is another object of this invention to provide a trolling assembly with breakaway system that can be readily deployed and retracted without the need of any special tools.

It is another object of this invention to provide a trolling assembly with breakaway system, which is of a durable and reliable construction.

It is yet another object of this invention to provide a trolling assembly with breakaway system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a trolling assembly with breakaway system, and is generally referred to with numeral 10. It can be observed that it basically includes movable arm assembly 20, adjustable assembly 50, mounting assembly 80, arm connector assembly 100, shield arm assembly 140, and actuator assembly 160.

Figure 1:
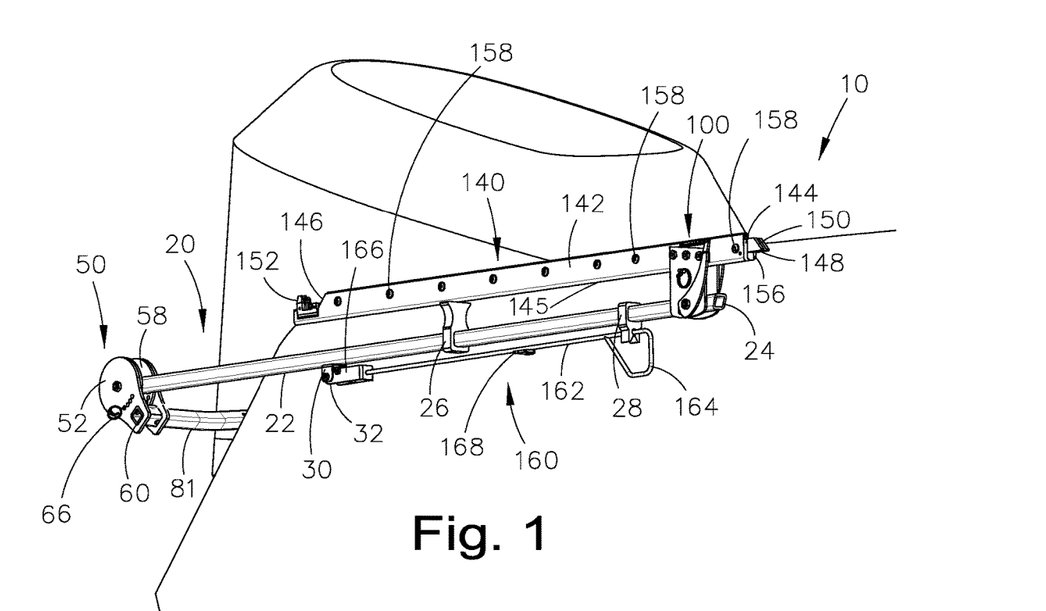
FIG. 1 is a first isometric view of the present invention mounted onto a sea vessel and in a retracted configuration.
Figure 4:
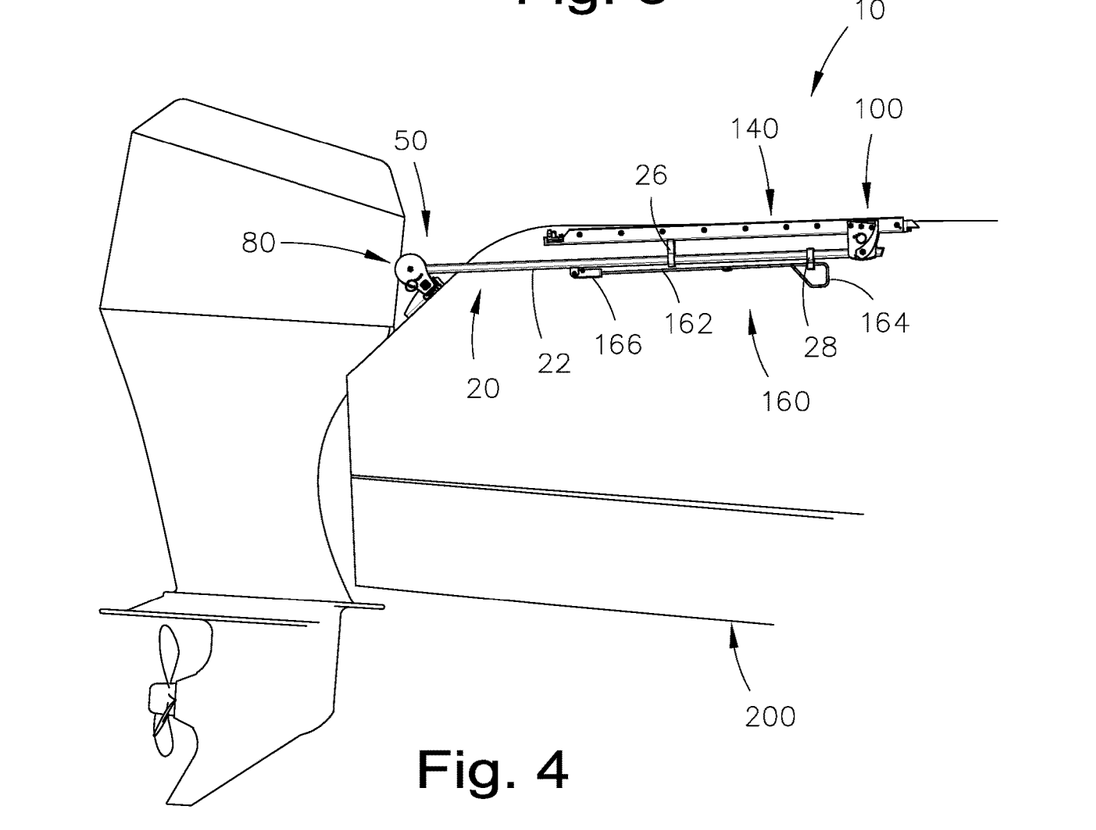
FIG. 4 is a first side view of the present invention mounted onto the sea vessel and in the retracted configuration.

As seen in FIG. 1, movable arm assembly 20 comprises arm 22 having ends 24, as better seen in FIG. 4, bumper 26, and springed actuator holder 28. Arm 22 also comprises coupler 30 having pin 32.

Figure 2:
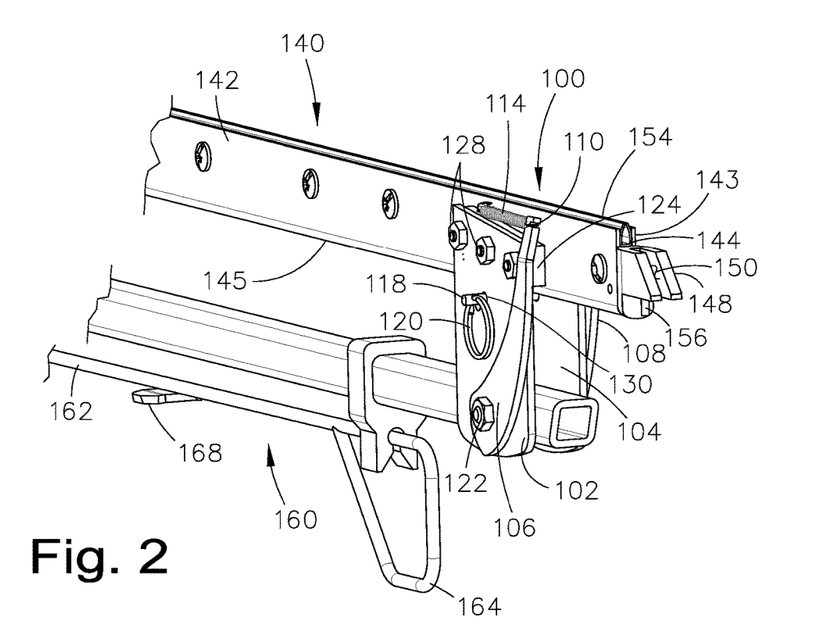
FIG. 2 is a first isometric view of the arm connector assembly connecting a movable arm assembly and a shield arm assembly in the retracted configuration.

Shield arm assembly 140 comprises first arm wall 142 and second arm wall 143, as seen in FIG. 2, having first and second ends 144 and 146 respectively, and channel 154, as seen in FIG. 2. Arm walls 142 and 143 define tapered edge 145. Extending from first end 144 is guide member 148 having slot 150, and extending from second end 146 is release member 152. Extending perpendicularly from guide member 148 is line support pin 156. Line support pin 156 holds temporarily fishing line 190 seen in FIG. 7. Bolts 158 secure first arm wall 142 and second arm wall 143 of shield arm assembly 140. Sandwiched between first arm wall 142 and second arm wall 143 is an elongated plastic structure for support and to prevent first arm wall 142 and second arm wall 143 from collapsing.

Actuator assembly 160 comprises actuator arm 162 with handle 164, coupling structure 166, and retention tab 168. When present invention 10 is in a retracted configuration, bumper 26 supports shield arm assembly 140, and springed actuator holder 28 secures actuator assembly 160. Actuator assembly 160 is hingedly attached to movable arm assembly 20, whereby coupling structure 166 is joined to coupler 30 by pin 32.

Figures 8, 9:
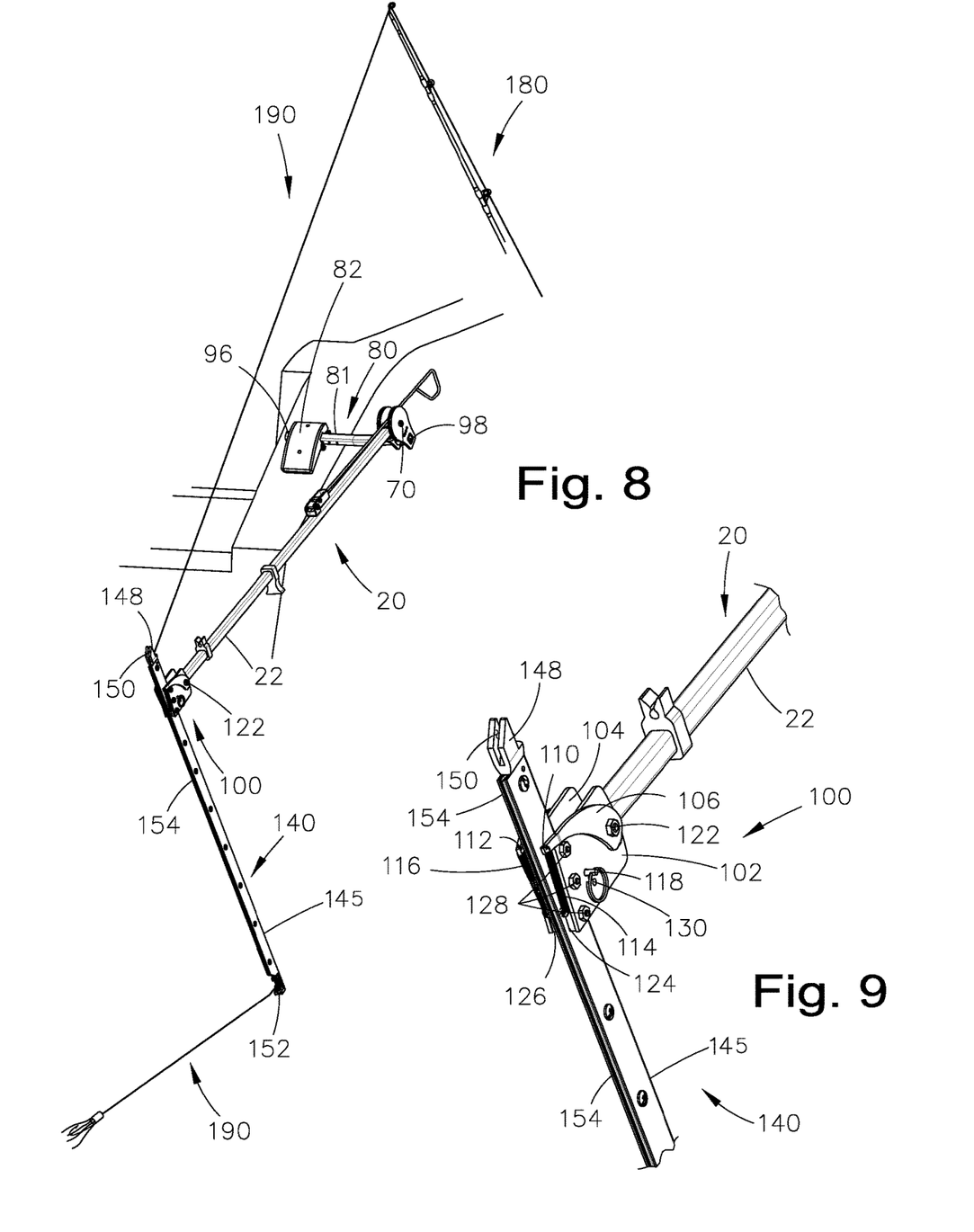
FIG. 8 is a fourth isometric view of the present invention mounted onto the sea vessel and in the deployed configuration.
FIG. 9 is a second isometric view of the arm connector assembly connecting the movable arm assembly and the shield arm assembly in the deployed configuration but without the fishing line.

As seen in FIG. 2, arm connector assembly 100 comprises first plate 102, second plate 104, first spring retainer 106, second spring retainer 108, first spring 114, and second spring 116, as seen in FIG. 9. First spring retainer 106 and second spring retainer 108 comprise respective hooks 110 and 112, as seen in FIG. 9. Arm connector assembly 100 further comprises pin 118, lock ring 120, connecting bolt 122, first supporting structure 124, second supporting structure 126, as seen in FIG. 9, and bolts 128.

Figure 3:
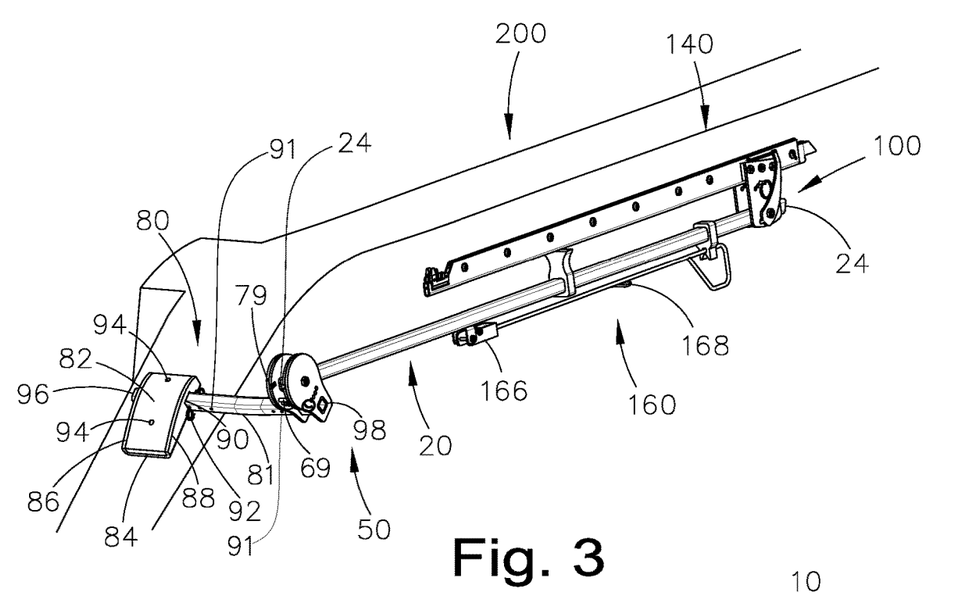
FIG. 3 is a second isometric view of the present invention mounted onto the sea vessel and in the retracted configuration.

As seen in FIGS. 3 and 4, mounting assembly 80 comprises extension arm 81, cover 82, and mounting base 84 having first and second lateral walls 86 and 88. In a preferred embodiment, extension arm 81 has first and second extension arm ends 96 and 98. Mounting assembly 80 is removably mounted onto sea vessel 200, whereby mounting base 84 is secured onto sea vessel 200 with any number of screws, and/or bolts and nuts with washers if desired. Screws 94 secure cover 82 onto mounting base 84. Mounting hole 90 extends from first lateral wall 86, through cover 82, to second lateral wall 88 to receive extension arm 81. Extension arm 81 extends from mounting assembly 80 to connect with adjustable assembly 50. Extension arm 81 comprises a plurality of holes 91 located at a first and second portion of extension arm assembly 81 close to respective ends 96 and 98. First and second portion of extension arm assembly 81 comprises the sections close to respective first and second ends 96 and 98. A first portion of extension arm 81 passes through mounting hole 90, and first extension arm end 96 extends from lateral wall 86. Locks 92 secure the first portion of extension arm 81, whereby a first lock 92 is positioned close to first lateral wall 86 and a second lock 92 is positioned close to second lateral wall 88. First and second locks 92 are positioned in any pair of holes 91 according to the position or distance desired.

Figure 5:
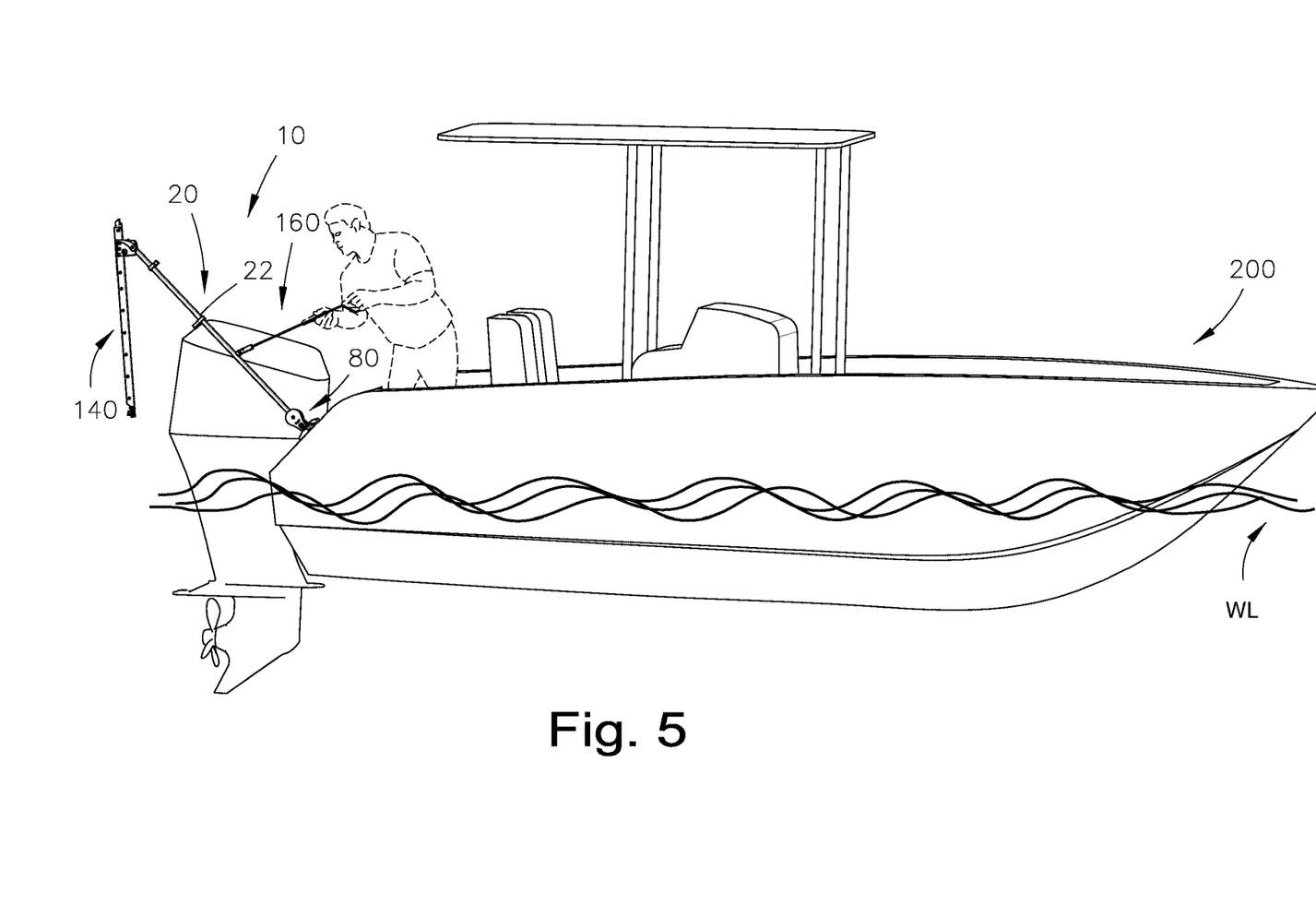
FIG. 5 is a second side view of the present invention mounted onto the sea vessel being positioned into a deployed configuration from the retracted configuration.

As seen in FIG. 5, present invention 10 is mounted onto sea vessel 200 and is being positioned into a deployed configuration from the retracted configuration, whereby actuator assembly 160 is used to move and place into position movable arm assembly 20 and shield arm assembly 140. More specifically, actuator assembly 160 is operably attached to arm 22 to place present invention 10 into the deployed and retracted configurations.

Figures 6, 7:
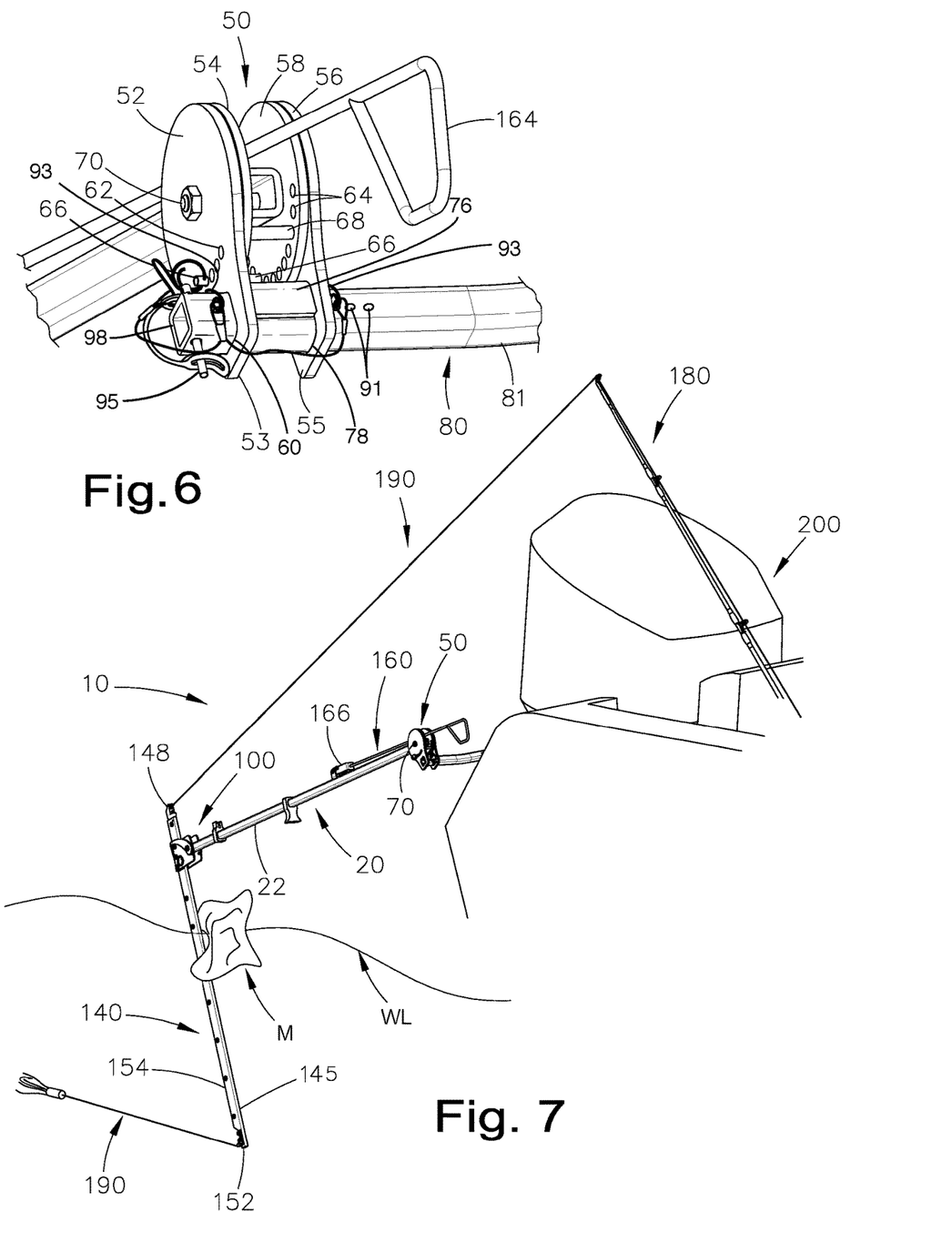
FIG. 6 is an isometric view of an adjustable assembly of the present invention.
FIG. 7 is a third isometric view of the present invention mounted onto the sea vessel, whereby the shield arm assembly defines an acute angle, while in the deployed configuration, with a water line that the sea vessel is in while in a path of travel to shield the fishing line and baits and/or lures from seaweed and debris.

Sea vessel 200 may be any watercraft or marine vessel, including, but not limited to boats, yachts, and the like from where fishing and particularly trolling is possible with rod 180, seen in FIG. 7. In a preferred embodiment, sea vessel 200 comprises at least one outboard motor.

As seen in FIG. 6, adjustable assembly 50 comprises first and second external plates 52 and 56 having respective first and second internal faces 53 and 55, and first and second external plate holes 60 and 78. Adjustable assembly 50 further comprises first and second internal plates 54 and 58, connector bolt 70, and holding plate 76. First and second internal plates 54 and 58 comprise notches 79 to receive retention tab 168, both seen in FIG. 3.

First and second internal plates 54 and 58 are attached to respective first and second internal faces 53 and 55. External plates 52 and 56 comprise external multiple adjusting holes 62, and internal plates 54 and 58 comprises internal multiple adjusting holes 64. External multiple adjusting holes 62 align indistinctly with any of internal multiple adjusting holes 64. Locking pin 66 is a pin lock bolt with a locking ring, which passes through two respective pairs of external multiple adjusting holes 62 and internal multiple adjusting holes 64 to fix external plate 52 to respective internal plate 54, and external plate 56 to respective internal plate 58 in a predetermined position. The position wherein locking pin 66 is placed will determine the angle required for arm 22 to place shield arm assembly 140 at a required distance from the top of water line WL allowing the shield arm assembly 140 to properly function.

Adjustable assembly 50 further comprises first and second pins 68 and 69, as seen in FIG. 3, which extend from internal plate 54 to internal plate 58 relatively opposite each other. Pin 68 stops the movement of arm 22 in the retracted configuration, and pin 69, seen in FIG. 3, stops the movement of arm 22 in the deployed configuration when locking in place.

Holding plate 76 extends from first internal face 53 to second internal face 55 close to respective first and second external plate holes 60 and 78. In a preferred embodiment, holding plate 76 is adjacent to first and second external plate holes 60 and 78. A second portion of extension arm 81 passes through first external plate hole 60 and second external plate hole 78 wherein is secured.

In a preferred embodiment, the second portion of extension arm 81 extends from first external plate 52 and locks 93 secure it, whereby first and second locks 93 are positioned on any pair of holes 91, close to respective first and second external plates 52 and 56, according to the position or distance desired. In the illustrated preferred embodiment, security pin 95 passes through extension arm 81 close to second extension arm end 98, and perpendicularly positioned respect to first and second locks 93, to extra secure the connection between extension arm 81 and adjustable assembly 50. It is noted that FIG. 6 is the only illustration illustrating this preferred embodiment.

As seen in FIG. 7, movable arm assembly 20 is connected to adjustable assembly 50, whereby arm 22 hingedly rotates approximately up to 300 degrees upon connector bolt 70 from a maximum retracted to a maximum deployed configuration.

Present invention 10 is structured to guide a first portion of fishing line 190 and to releasably retain a second portion of fishing line 190. In operation, a first portion of fishing line 190 is aligned by guide member 148 and is held into channel 154 toward release member 152 and a second portion of fishing line 190 extends therefrom at a predetermined depth beneath water line WL while trolling with baits and/or lures for fishing. More specifically, shield arm assembly 140 breaks water line WL and extends to a predetermined depth at which point the second portion of fishing line 190 is deployed for trolling. In the retracted configuration, which is a rigging configuration, the first portion of fishing line 190 is wrapped around line support pin 156, seen in FIG. 2, then passes through guide member 148 to be aligned and retained along channel 154 toward release member 152. Line support pin 156 holds temporarily fishing line 190, so the pulling of fishing line 190 by the spring pull of rod 180, does not remove fishing line 190 from guide member 148. As the movable arm assembly 20 is raised toward the deployed configuration, fishing line 190 releases from line support pin 156 resulting in fishing line 190 extending from rod 180 and secured in channel 154 and ready to be placed in the deployed configuration for fishing.

The second portion of fishing line 190 extends from release member 152 a predetermined length for fishing. The second portion of fishing line 190 is protected from matter M, such as but not limited to, water-borne debris and seaweed while trolling in a body of water, especially if floating or approximately just below water line WL.

Rod 180 may be hand held by a fisherman riding on sea vessel 200 or it may be supported within a rod holder or other device suitable for supporting rod 180 while trolling.

As seen in FIGS. 8 and 9, arm connector assembly 100 connects movable arm assembly 20 and shield arm assembly 140. Movable arm assembly 20 rotates upon connecting bolt 122. Pin 118 is positioned into one of the multiple angle adjustment holes 130. Angle adjustment holes 130 determine that the angle defined by shield arm assembly 140 with water line WL becomes more or less acute.

Spring retainers 106 and 108, as seen in FIG. 2, are fixed onto respective plates 102 and 104 by connecting bolt 122, and extend along respective plates 102 and 104 until reaching respective springs 114 and 116. Springs 114 and 116 extend from respective first and second supporting structures 124 and 126 to hook on respective hooks 110 and 112.

Figures 10, 11:
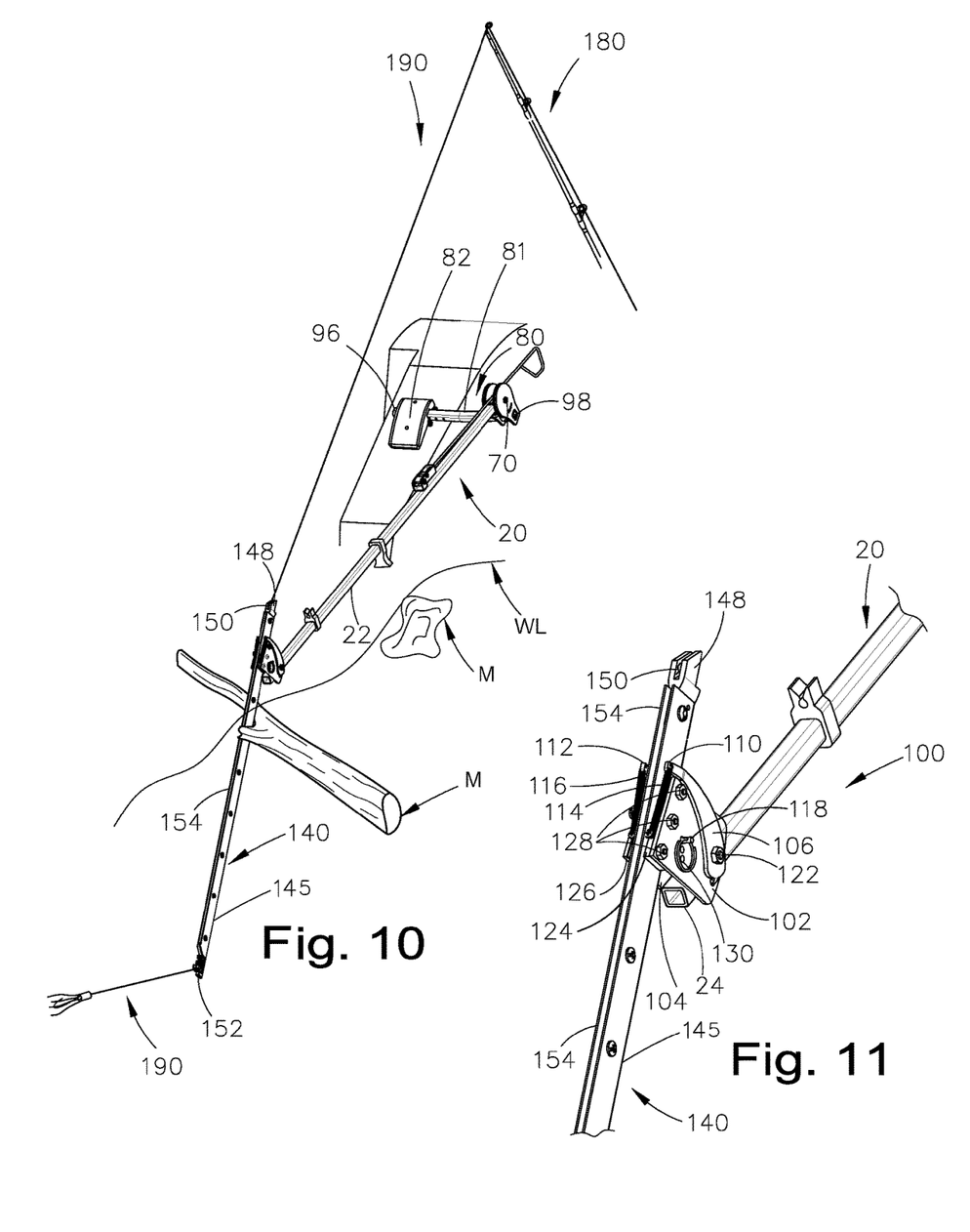
FIG. 10 is a fifth isometric view of the present invention mounted onto the sea vessel and in the deployed configuration after the shield arm assembly is released from the acute angle after a predetermined force greater than a predetermined resistance is applied onto the shield arm assembly.
FIG. 11 is a close isometric view of the present invention as seen in FIG. 10 but without the fishing line.

As seen in FIGS. 10 and 11, shield arm assembly 140 is connected to arm connector assembly 100, whereby bolts 128 fix respective plates 102 and 104 providing shield arm assembly 140 a predetermined resistance. First and second springs 114 and 116 are hooked onto respective first and second spring retainers 106 and 108, seen in FIG. 2, and allow shield arm assembly 140 to release when a predetermined force greater than the predetermined resistance is applied onto shield arm assembly 140. Although not illustrated, it is understood that plates 102 and 104, and first and second spring retainers 106 and 108, each comprise elongated holes for connecting bolt 122 to pass through. The elongated holes are what enable the release when the predetermined force greater than the predetermined resistance is applied onto shield arm assembly 140, whereby first and second springs 114 and 116 and respective first and second spring retainers 106 and 108 shift allowing pin 118 to pass over end 24. The predetermined force could be from a hard object such as matter M that hits shield arm assembly 140 while trolling. Such a hard object defined as matter M may be for example a log or other debris floating in the body of water as seen in FIG. 10.

Figure 12:
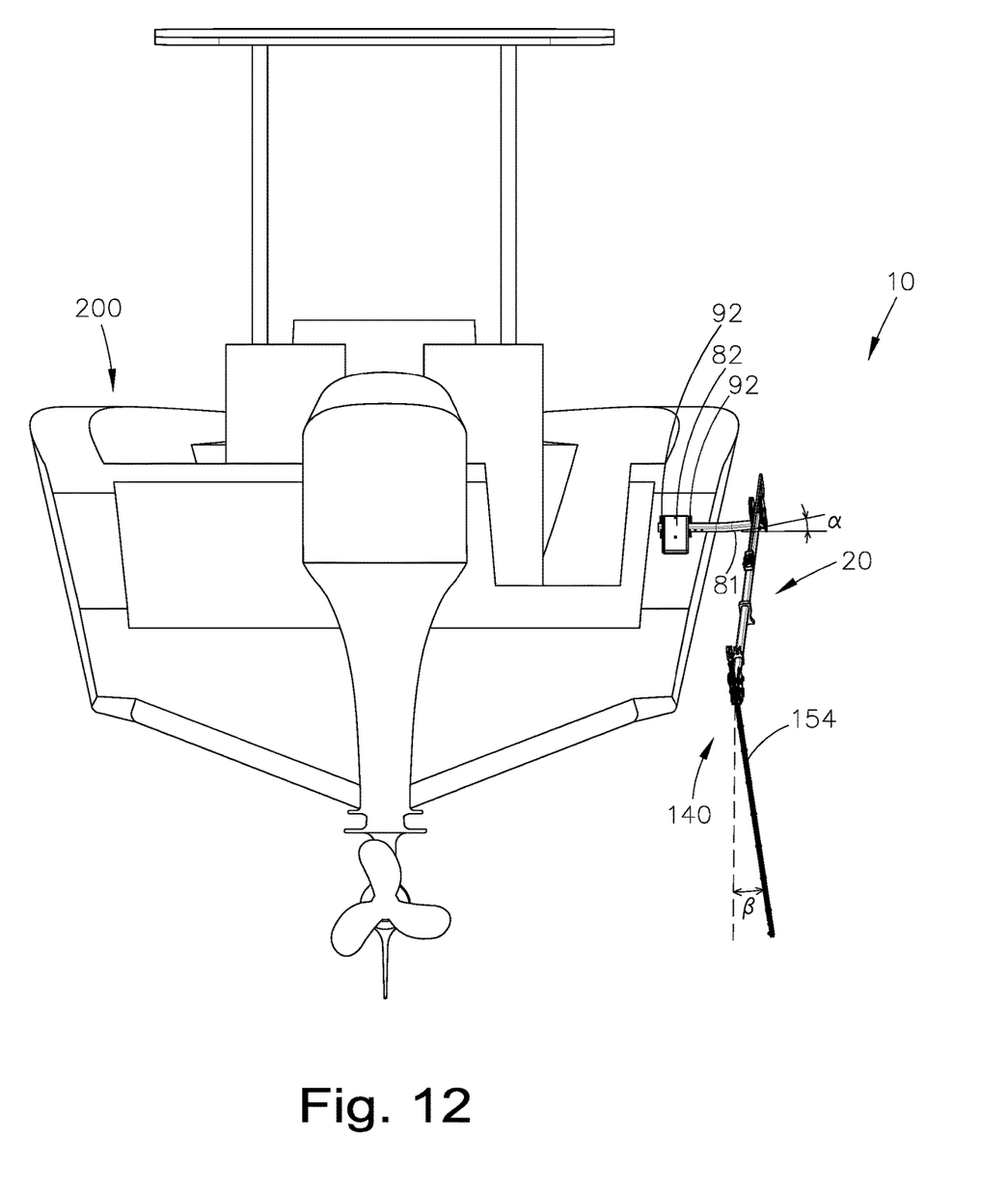
FIG. 12 is a rear view of the present invention mounted onto the sea vessel and in the deployed configuration.

As seen in FIG. 12, in a preferred embodiment, present invention 10 is mounted onto the rear gunnel of sea vessel 200. Extension arm 81 defines a first predetermined angle α. In the deployed configuration, first predetermined angle α allows for shield arm assembly 140 to extend outwardly from sea vessel 200 to define a second predetermined angle β. The second predetermined angle β prevents contact of shield arm assembly 140 with sea vessel 200, specifically with its propeller(s). Second predetermined angle β keeps shield arm assembly 140 from being pulled towards the back area of sea vessel 200 due to whirlpools and forces created by the propeller(s). When sea vessel 200 has one outboard motor, the offset at the bottom of shield arm assembly 140 is approximately 6 to 7 inches outwards away from sea vessel 200. As the amount of motors increases second predetermined angle β should also increase. Second predetermined angle β also allows shield arm assembly 140 to hydrofoil at high speeds through the water.

It is noted that second predetermined angle β is directly proportionate to first predetermined angle α. In the event that sea vessel 200 comprises more than one motor, first predetermined angle α is increased to therefore increase second predetermined angle β. A larger second predetermined angle β is also desired to help prevent fishing line 190 from becoming entangled with the propellers of sea vessel 200, seen in FIGS. 12 and 13. It is noted that a sufficiently long movable arm assembly 20 is also desirable to prevent fishing line 190 from becoming entangled with the propellers of sea vessel 200.

Present invention 10 may be mounted onto the starboard side of the rear gunnel of sea vessel 200 as illustrated. Although not illustrated, it is understood that present invention 10 may also be mounted onto the port side of the rear gunnel of sea vessel 200 as well.

Present invention 10 is made of a rigid and corrosion resistant material such as stainless steel, or other such metal, alloy, composite, or synthetic material that provides sufficient structural support. Channel 154 is made of a resilient material such as rubber, a sturdy flexible plastic, or other pliable material, which comprises sufficient structural integrity to retain and protect fishing line 190, as seen in FIG. 10.

Figure 13:
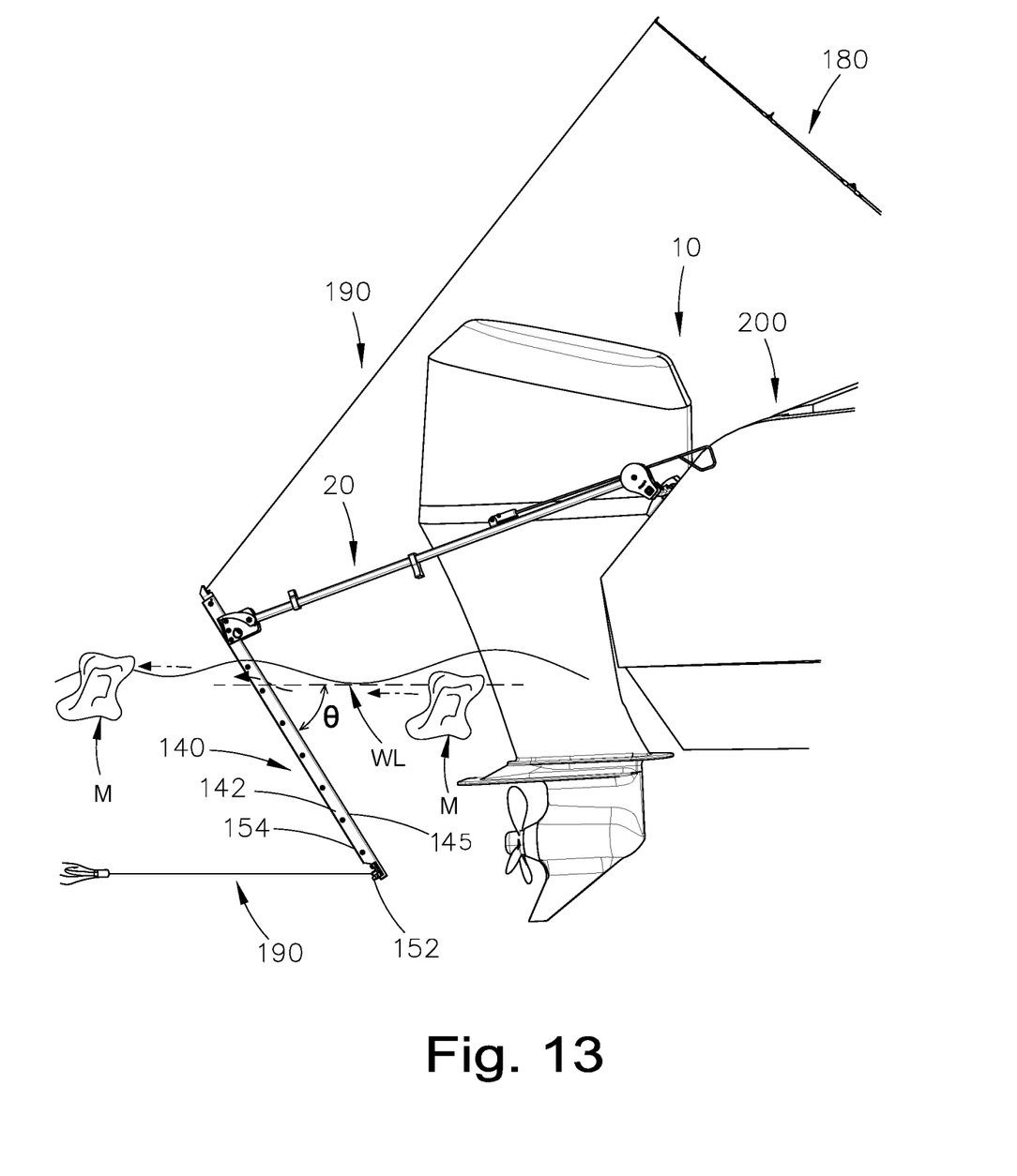
FIG. 13 is a third side view of the present invention mounted onto the sea vessel, whereby the shield arm assembly defines the acute angle, while in the deployed configuration, with the water line that the sea vessel is in while in the path of travel to shield the fishing line and baits and/or lures from seaweed and debris.

As seen in FIG. 13, shield arm assembly 140, while in a deployed configuration, defines an acute angle θ with water line WL that sea vessel 200 is in while in a path of travel, and in a preferred embodiment, the acute angle is approximately 70-80 degrees. Although it is understood that present invention 10 functions with an acute angle θ. Acute angle θ shields fishing line 190 and baits and/or lures from debris such as matter M, whereby shield arm assembly 140 disposed in this operative orientation, deployed configuration, pulls through a body of water. Seaweed and any other debris, such as matter M, contacting shield arm assembly 140 will be forced upwardly along tapered edge 145 towards water line WL, thereby preventing any engagement or entanglement with the portion of the fishing line 190 extending outwardly from release member 152 at the trailing end of shield arm assembly 140, below the surface of the body of water.

When in operation and a fish or marine animal strikes the bait and/or lure, the portion of the fishing line 190 extending outwardly from release member 152 at the trailing end of shield arm assembly 140 releases from release member 152, channel 154, and from guide member 148.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A trolling assembly with breakaway system, comprising:
   A) a movable arm assembly;
   B) an adjustable assembly, said movable arm assembly is movably connected to said adjustable assembly;
   C) a mounting assembly comprising an extension arm having a first predetermined angle, said mounting assembly is removably mounted onto a sea vessel, said extension arm extends from said mounting assembly to connect with said adjustable assembly;
   D) an arm connector assembly, said movable arm assembly is connected to said arm connector assembly, whereby said arm connector assembly hingedly rotates upon a connecting bolt, said arm connector assembly comprises first and second plates mounted thereto with said connecting bolt, first and second spring retainers are fixed onto a respective plate of said first and second plates by said connecting bolt, said first and second spring retainers extend along a respective plate of said first and second plates until reaching respective first and second hooks, first and second springs hook onto a respective hook of said first and second hooks, said first and second plates having respective angle adjustment holes, a pin is positioned into one of said adjustment holes;
   E) an actuator assembly attached to said movable arm assembly; and
   F) a shield arm assembly that defines a second predetermined angle which is an acute angle, while in a deployed configuration, with a water line formed along said sea vessel when said sea vessel is in a body of water while in a path of travel to shield a fishing line and baits and/or lures from seaweed and debris by pushing said seaweed and debris upwardly towards said water line along a tapered edge of said shield arm assembly to then be released, said shield arm assembly is fixedly connected to said arm connector assembly providing said shield arm assembly a predetermined resistance to maintain said acute angle while in said deployed configuration, said actuator assembly moves said movable arm assembly and said shield arm assembly to place said shield arm assembly into said deployed configuration and a retracted configuration, said shield arm assembly releases from said acute angle when a predetermined force greater than said predetermined resistance is applied onto said shield arm assembly.

2. The trolling assembly with breakaway system set forth in claim 1, further characterized in that said shield arm assembly, while in said deployed configuration, extends outwardly from said sea vessel to define said second predetermined angle.

3. The trolling assembly with breakaway system set forth in claim 1, further characterized in that said movable arm assembly comprises an arm having first and second ends, a bumper, and a springed actuator holder.

4. The trolling assembly with breakaway system set forth in claim 3, further characterized in that said adjustable assembly comprises first and second external plates having respective first and second internal faces, first and second internal plates are attached to respective internal faces of said respective first and second internal faces, said first and second external plates having respective first and second external plate holes, a connector bolt extends from said first external plate through said respective first and second internal plates and to said second external plate, a holding plate is mounted to a portion of said extension arm and extends from said first internal face to said second internal face and close to said respective first and second external plate holes.

5. The trolling assembly with breakaway system set forth in claim 4, further characterized in that said arm hingedly rotates approximately up to 300 degrees upon said connector bolt.

6. The trolling assembly with breakaway system set forth in claim 4, further characterized in that said mounting assembly further comprises a cover, a mounting base having first and second lateral walls, and a mounting hole.

7. The trolling assembly with breakaway system set forth in claim 6, further characterized in that said mounting hole extends from said first lateral wall, through said cover, to said second lateral wall to receive said extension arm.

8. The trolling assembly with breakaway system set forth in claim 6, further characterized in that said extension arm comprises first and second extension arm ends.

9. The trolling assembly with breakaway system set forth in claim 8, further characterized in that a first portion of said extension arm passes through said mounting hole, and said first extension arm end extends from said first lateral wall.

10. The trolling assembly with breakaway system set forth in claim 9, further characterized in that a second portion of said extension arm passes through said respective first and second external plate holes and said second extension arm extends from said first external plate.

11. The trolling assembly with breakaway system set forth in claim 1, further characterized in that said actuator assembly comprises an actuator arm with a handle, a coupling structure, and a retention tab.

12. The trolling assembly with breakaway system set forth in claim 1, further characterized in that said shield arm assembly comprises first and second arm walls defining said tapered edge, a guide member having a slot, a channel, and a release member.

13. The trolling assembly with breakaway system set forth in claim 12, further characterized in that while in said deployed configuration, a first portion of said fishing line is aligned by said guide member and is held into said channel toward said release member, and a second portion of said fishing line extends therefrom with said baits and/or lures for fishing.

* * * * *